United States Patent
Cheung et al.

(10) Patent No.: US 11,272,137 B1
(45) Date of Patent: Mar. 8, 2022

(54) EDITING TEXT IN VIDEO CAPTIONS

(71) Applicant: Facebook Technologies, LLC, Menlo Park, CA (US)

(72) Inventors: Vincent Charles Cheung, San Carlos, CA (US); Marc Layne Hemeon, Haleiwa, HI (US); Nipun Mathur, Belmont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/170,314

(22) Filed: Feb. 8, 2021

Related U.S. Application Data

(63) Continuation of application No. 16/601,102, filed on Oct. 14, 2019, now Pat. No. 10,917,607.

(51) Int. Cl.
| | |
|---|---|
| *H04N 9/80* | (2006.01) |
| *H04N 5/93* | (2006.01) |
| *G10L 15/26* | (2006.01) |
| *G11B 27/036* | (2006.01) |
| *G11B 27/34* | (2006.01) |

(52) U.S. Cl.
CPC ........... *H04N 5/9305* (2013.01); *G10L 15/26* (2013.01); *G11B 27/036* (2013.01); *G11B 27/34* (2013.01)

(58) Field of Classification Search
CPC ............. H04N 9/8715; H04N 21/4884; H04N 21/233; H04N 21/2743; H04N 21/42203; H04N 21/242; H04N 21/4223; H04N 5/9305; G01L 15/26; G11B 27/10; G11B 27/34; G11B 27/036

USPC ................ 386/240, 239, 248, 278, 285, 340
See application file for complete search history.

(56) References Cited

U.S. PATENT DOCUMENTS

| | | | |
|---|---|---|---|
| 10,917,607 | B1 | 2/2021 | Cheung et al. |
| 2007/0011012 | A1* | 1/2007 | Yurick .................... G10L 15/26 704/277 |
| 2015/0106091 | A1 | 4/2015 | Wetjen et al. |
| 2019/0096390 | A1 | 3/2019 | Kurata et al. |
| 2019/0200072 | A1* | 6/2019 | Camargo ............. H04N 21/242 |
| 2020/0053215 | A1 | 2/2020 | Kats et al. |
| 2020/0335135 | A1* | 10/2020 | Li ...................... H04N 5/23229 |

OTHER PUBLICATIONS

Prosecution History from U.S. Appl. No. 16/601,102, dated Jun. 29, 2020 through Oct. 16, 2020, 19 pp.

* cited by examiner

*Primary Examiner* — Robert Chevalier
(74) *Attorney, Agent, or Firm* — Shumaker & Sieffert, P.A.

(57) ABSTRACT

This disclosure describes techniques that include modifying text associated with a sequence of images or a video sequence to thereby generate new text and overlaying the new text as captions in the video sequence. In one example, this disclosure describes a method that includes receiving a sequence of images associated with a scene occurring over a time period; receiving audio data of speech uttered during the time period; transcribing into text the audio data of the speech, wherein the text includes a sequence of original words; associating a timestamp with each of the original words during the time period; generating, responsive to input, a sequence of new words; and generating a new sequence of images by overlaying each of the new words on one or more of the images.

20 Claims, 10 Drawing Sheets

EDITING TEXT IN VIDEO CAPTIONS

CROSS REFERENCE

This application is a continuation application of and claims priority to U.S. patent application Ser. No. 16/601,102 filed on Oct. 14, 2019, which is hereby incorporated by reference herein in its entirety.

TECHNICAL FIELD

This disclosure generally relates to video display techniques, and more particularly, to systems for displaying text captions in video.

BACKGROUND

Videos are widely shared among friends, families, colleagues, and other groups of people. Often, videos can more effectively convey a message than text or images. Yet videos can be enhanced by superimposing text on images within a video. Adding textual comments or captions in videos is becoming an increasingly popular way to more effectively convey a message with a video.

SUMMARY

This disclosure describes techniques that include modifying original text associated with a sequence of images or a video sequence and overlaying the modified text as captions in the video sequence. In some examples, the original text associated with the video sequence may correspond to audio of speech spoken by a subject of the video, or by a narrator of the video, while the video sequence is captured. In such an example, the new, modified text captions may be included within one or more images within the video sequence by considering the timing and/or pacing of the original text relative to timestamps or events in the video sequence, or by considering the timing and/or pacing of the audio sounds corresponding to speech occurring within the video sequence.

In some examples, the modified text captions may be rendered and displayed within the video sequence in a manner that preserves alignment, synchronization, pace, and/or timing of speech by the original speaker, and/or preserve the flow of the original text associated with the video sequence. To preserve such attributes, timestamps may be associated with each of the words in the original text. Modified text captions may be presented as captions in the video sequence by giving preference to maintaining timestamps of the original words and/or timestamps of original words that correspond with new or modified words.

Techniques in accordance with one or more aspects of the present disclosure may enable technical advantages. For instance, by generating an initial text caption based on text transcribed or converted from audio data may enable a user to more quickly generate the final set of captions. Also, providing an ability to edit transcribed captions may enable a user to efficiently fix errors in an audio transcription while still retaining appropriate timing of originally-captured audio (and video) events.

In some examples, this disclosure describes operations performed by a computing system in accordance with one or more aspects of this disclosure. In one specific example, this disclosure describes a system comprising a storage system and processing circuitry having access to the storage system, wherein the processing circuitry is configured to: receive audio data associated with a scene occurring over a time period, wherein the audio data includes data representing speech uttered during the time period; transcribe the audio data of the speech into text, wherein the text includes a sequence of original words; associate a timestamp with each of the original words during the time period; receive, responsive to user input, a sequence of new words; and associate a timestamp with each of the new words in the sequence of new words by using the timestamps associated with the original words to determine a corresponding time during the time period for each of the new words.

In another example, this disclosure describes a method comprising receiving, by a computing system, audio data associated with a scene occurring over a time period, wherein the audio data includes data representing speech uttered during the time period; transcribing, by the computing system, the audio data of the speech into text, wherein the text includes a sequence of original words; associating, by the computing system, a timestamp with each of the original words during the time period; receiving, by the computing system and responsive to user input, a sequence of new words; and associating, by the computing system, a timestamp with each of the new words in the sequence of new words by using the timestamps associated with the original words to determine a corresponding time during the time period for each of the new words.

In another example, this disclosure describes a computer-readable storage medium comprises instructions that, when executed, configure processing circuitry of a computing system to receive audio data associated with a scene occurring over a time period, wherein the audio data includes data representing speech uttered during the time period; transcribe the audio data of the speech into text, wherein the text includes a sequence of original words; associate a timestamp with each of the original words during the time period; receive, responsive to user input, a sequence of new words; and associate a timestamp with each of the new words in the sequence of new words by using the timestamps associated with the original words to determine a corresponding time during the time period for each of the new words.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
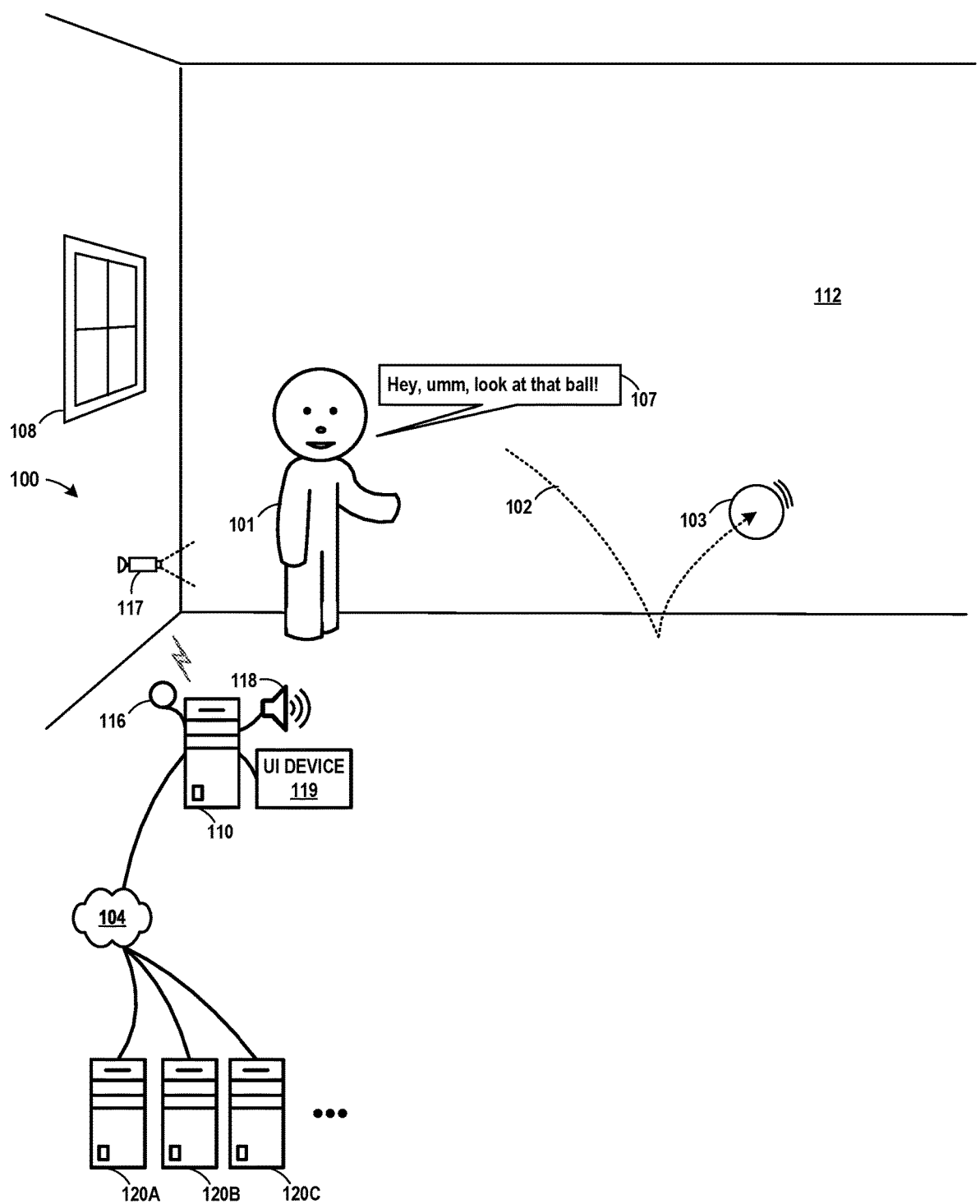
FIG. 1A is a conceptual diagram illustrating an example system for generating and/or editing captions in accordance with one or more aspects of the present disclosure.

FIG. 1A is a conceptual diagram illustrating an example system for generating and/or editing captions in accordance with one or more aspects of the present disclosure. System 100 is depicted within environment 112. In the example shown, environment 112 includes user 101, object 103, and window 108. System 100 includes computing system 110, one or more sensors 116, one or more cameras 117, one or more audio devices 118, and one or more user interface devices 119. Any of sensors 116, cameras 117, audio devices 118, and/or user interface devices 119 may be directly connected or and/or in wireless communication with computing system 110. While each of sensors 116, cameras 117, audio devices 118, and user interface devices 119 is illustrated in FIG. 1A as a separate device distinct from computing system 110, in other examples, one or more of sensors 116, cameras 117, audio devices 118, and/or user interface devices 119 may be integrated into computing system 110.

User interface device 119 may, in some examples, represent one or more input devices, one or more output devices, or one or more combined input and output devices. For instance, user interface devices 119 may include an input device such as a keyboard, mouse, microphone, or in general, any type of device capable of detecting input from a human or machine. User interface devices 119 may also include an output device, such as a display, speaker, tactile feedback device, or in general, any type of device capable of outputting information to a human or machine. Further, user interface device 119 may also be a combined input and output device, such as a presence-sensitive or touch-screen panel capable of both presenting images on the panel and detecting interactions (e.g., touch interactions) with the panel.

Computing system 110 is illustrated as being in communication, via network 104, with compute nodes 120A, 120B, and 120C (collectively "compute nodes 120" and representing any number of compute nodes). Each of compute nodes 120 may correspond to computing resources in any form. Each of compute nodes 120 may be a physical computing device or may be a component of a cloud computing system, server farm, and/or server cluster (or portion thereof) that provides services to client devices and other devices or systems. Accordingly, any of compute nodes 120 may represent physical computing devices, virtual computing devices, virtual machines, containers, and/or other virtualized computing device.

Computing system 110 in FIG. 1A is shown as a single computing device, which may correspond to a mobile phone, a tablet, a gaming console, workstation, a desktop computer, laptop, or other computing device. In other examples, computing system 110 may be distributed across a plurality of computing devices, such as a distributed computing network, a data center, or a cloud computing system. Computing system 110 may, in some examples, encompass one or more of compute nodes 120.

Network 104 may be the internet, or may include or represent any public or private communications network or other network. For instance, network 104 may be or may include a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 104 using any suitable communication techniques. Network 104 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 1A may be operatively coupled to network 104 using one or more network links.

FIG. 1A depicts a scene in which a subject, such as user 101, points to object 103 traveling along path 102. While pointing, user 101 says "Hey, umm, look at that ball!" in reference to object 103. During the scene, computing system 110 captures a sequence of images using camera 117. Computing system 110 also captures, during the scene, a stream of audio data using sensor 116. By collecting the sequence of images and the stream of audio, computing system 110 thereby captures data sufficient to create a video of the scene. While primarily described with respect to text captions for captured video, the techniques are also applicable to other types of generated video, such as animations of scenes (including computer-generated imagery). Audio for video may be captured coterminous with the video or generated separately from the video recording or generation, such as by voiceover recordings.

In FIG. 1A, user 101 is part of the scene in the sense that user 101 is a subject of the captured images and is also a source of audible speech occurring in the scene. However, in other examples, user 101 might not be a subject of captured images in the scene, and/or might not be a source of audible speech occurring in the scene. In such other examples, the captured images may have a different subject and audio may be generated by a different source. In addition, some scenes may include a plurality of other persons, users, or human subjects. For convenience, examples are described herein as capturing images of user 101 and audio from speech spoken by user 101. However, it should be understood that other techniques in accordance with one or more aspects of this disclosure may encompass other types of scenes, involving captured images of other subjects and captured audio generated by other persons, objects, or subjects.

In some examples described herein, computing system 110 may capture images and audio of a scene, such as that depicted in FIG. 1A, and generate initial text captions for a video of the scene using speech recognition techniques. Computing system 110 may, in response to interactions with user 101 (or another user), modify, correct, or otherwise change the initial text captions generated by computing system 110. Computing system 110 may make such modifications to the initial text captions by dynamically adjusting the timing of the display and rendering of the words of the edited text caption to preserve alignment and synchronization with the pace and timing of speech by the original speaker. By adjusting the timing of the display to preserve such alignment and synchronization, the visual effect of the modified text-based caption may be improved or presented in a more natural and synchronous fashion.

To effectively present modified captions in such a way, computing system 110 may generate and/or record timestamps of the beginning and ending of each word in the initial text captions, and use such timestamps to determine which of the images in a sequence of images the new text captions will be included. In some examples, generating or recording timestamps may be part of capturing images and/or audio of a scene, as described above. The timestamps may be used to determine proper image placement or alignment of words in scenarios that may include replacing original words with new words, removing original words without replacement, inserting new words between original words, and other scenarios. Further, in some examples, computing system 110 may incorporate language translation techniques when modifying initial text captions. In such an example, computing system 110 may perform sequence alignment of words to synchronize a translated text caption with the original pace and timing of the speech by the original speaker in the original language.

Figure 1B:
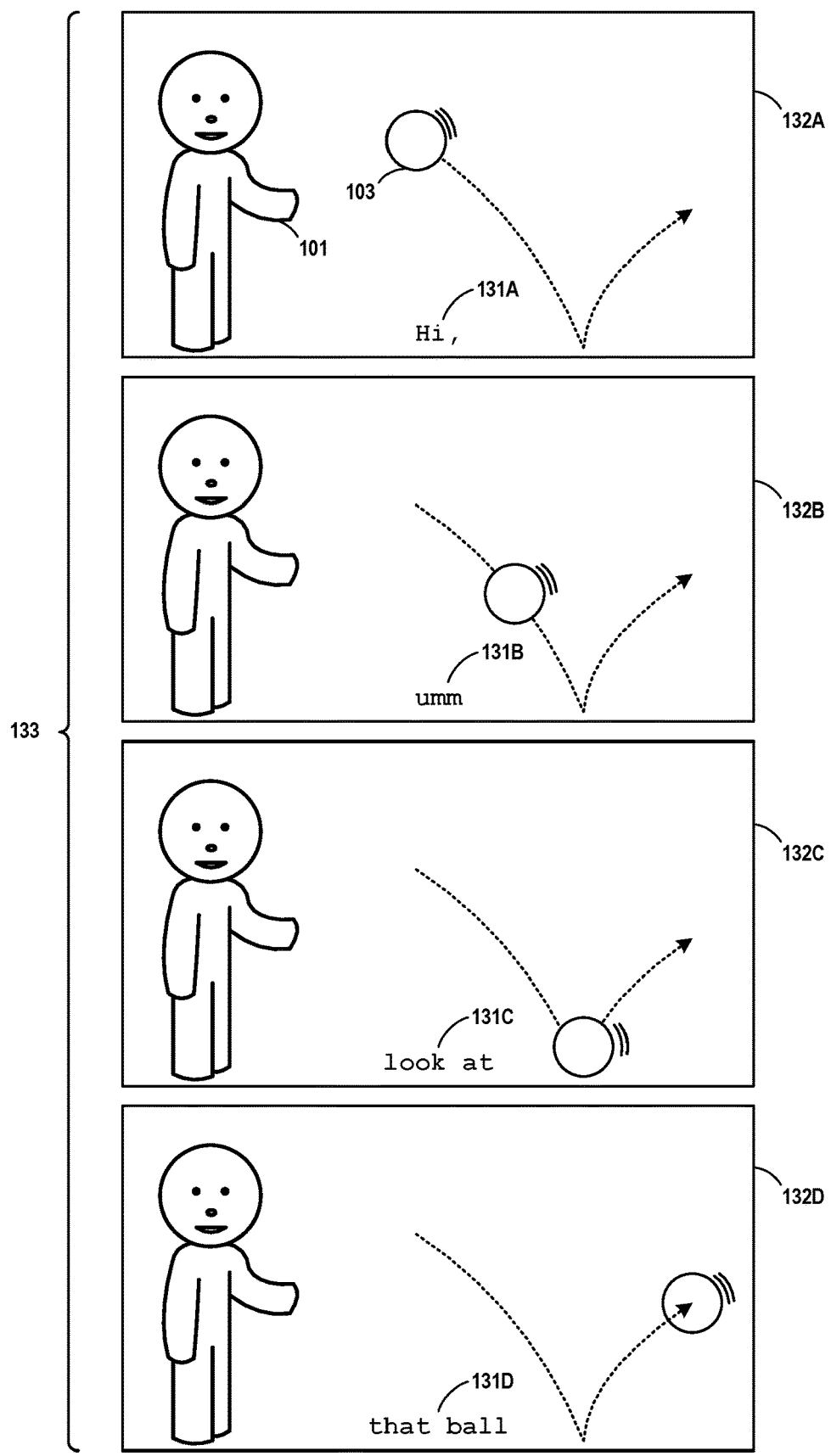
FIG. 1B is a conceptual diagram illustrating an example video sequence including a series of images overlaid with captions transcribed or parsed from speech, in accordance with one or more aspects of the present disclosure.

FIG. 1B is a conceptual diagram illustrating an example video sequence including a series of images overlaid with captions transcribed or parsed from speech, in accordance with one or more aspects of the present disclosure. In FIG. 1B, a images 132A through 132D (collectively "images 132" and representing any number of images) from video sequence 133 are illustrated. In the example shown, object 103 is in motion when computing system 110 captures video sequence 133, so in each of image 132A through 132D, object 103 is illustrated in a different position. Each of images 132 are overlaid with a caption (caption 131A, caption 131B, caption 131C, and caption 131D) corresponding to text converted from audio data by computing system 110. The overlaid captions illustrated in images 132 of FIG. 1B correspond to parsed text prior to any editing by a user.

Figure 1C:
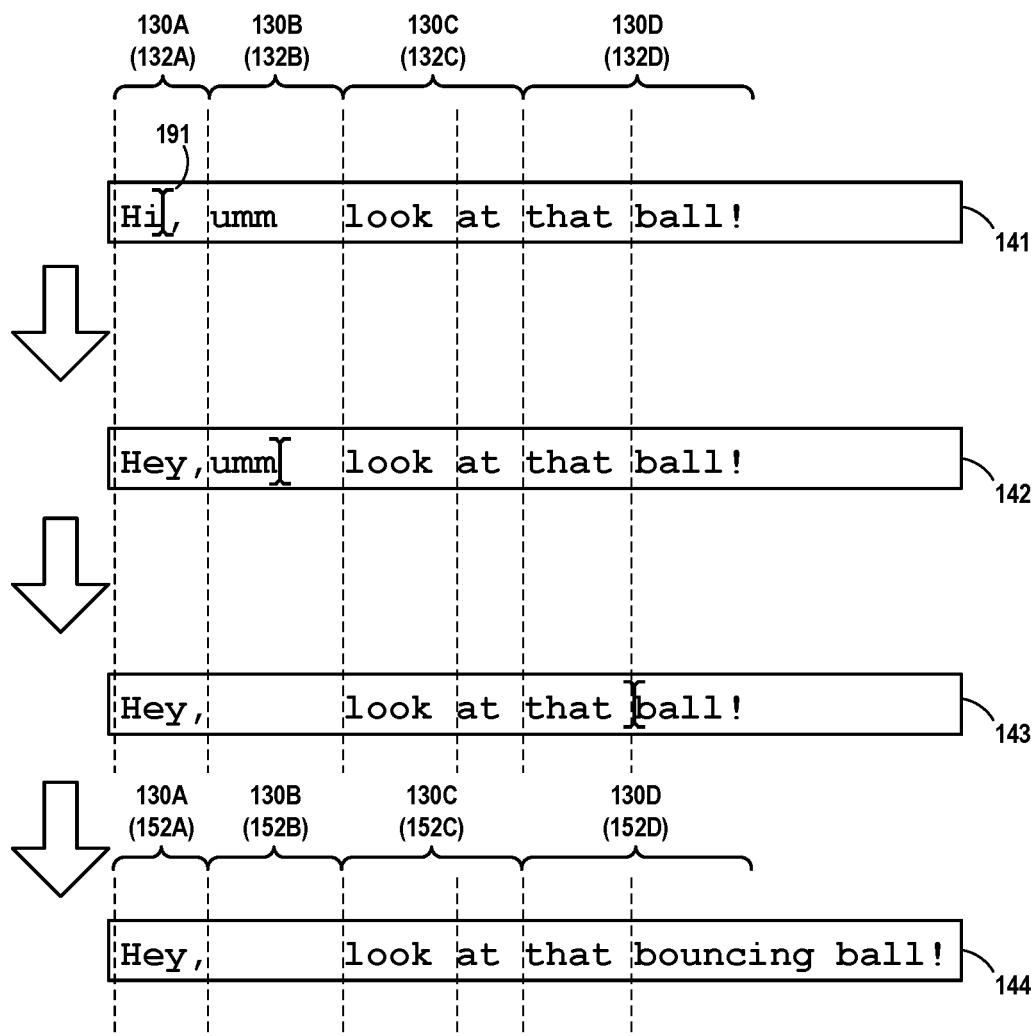
FIG. 1C is a conceptual diagram illustrating four strings of text representing a series of edits or modifications performed on original text converted from speech, in accordance with one or more aspects of the present disclosure.

FIG. 1C is a conceptual diagram illustrating four strings of text representing a series of edits or modifications performed on original text converted from speech, in accordance with one or more aspects of the present disclosure. In FIG. 1C, sequence of words 141 corresponds to a string of text converted by computing system 110 based on audio captured by sensor 116. The dashed lines illustrated in FIG. 1C correspond to timestamps for each of the words in sequence of words 141. Sequence of words 142, sequence of words 143, and sequence of words 144 represent modified versions of an original sequence of words 141 after successive editing operations performed on the original text. For each successive sequence of words in FIG. 1C, text in each modified sequence are aligned with corresponding words in the original sequence of words 141, as illustrated with the dashed lines. Time periods 130A through 130D correspond to time periods during which captions may be included within a video sequence.

Figure 1D:
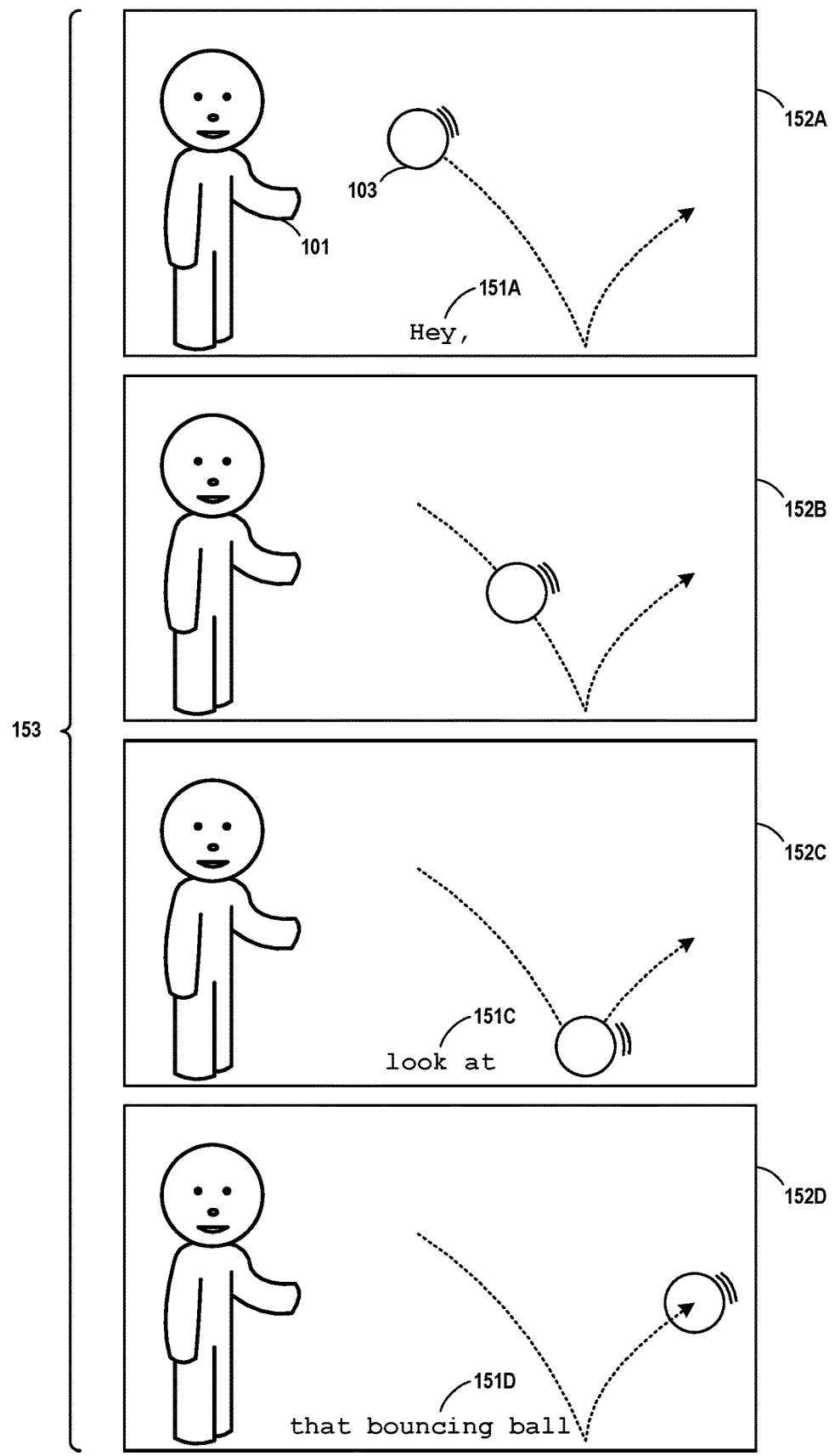
FIG. 1D is a conceptual diagram illustrating an example video sequence including a series of images overlaid with captions generated from edited original captions, in accordance with one or more aspects of the present disclosure.

FIG. 1D is a conceptual diagram illustrating an example video sequence including a series of images overlaid with captions generated from edited original captions, in accordance with one or more aspects of the present disclosure. In FIG. 1D, a images 152A through 152D (collectively "images 152," representing any number of images) from video sequence 153 are illustrated. Each of images 152 are overlaid with a caption corresponding to the edited text illustrated in sequence of words 144 of FIG. 1C. The overlaid captions illustrated in images 152 of FIG. 1B correspond to the edited text from sequence of words 144, but are placed in each of images 152 to preserve timing, pacing, and/or flow of the original sequence of words 141 converted or parsed from speech derived from the audio of the scene corresponding to video sequence 153.

In FIG. 1D, each of images 152 has been annotated with a caption or words from sequence of words 144. For instance, image 152A, which is an image occurring during time period 130A (see FIG. 1C), has been annotated to include words from sequence of words 144 corresponding to time period 130A ("Hey"). Similarly, image 152C, occurring during time period 130C, has been annotated to include words ("look at") from sequence of words 144 corresponding to time period 130C. Also, image 152D, occurring during time period 130D, has been annotated to include words ("that bouncing ball") from sequence of words 144 corresponding to time period 130D. In the example shown in FIG. 1D, image 152B is not annotated to include captions, since no words from sequence of words 144 correspond to time period 130B.

In the example of FIG. 1D, captions are presented within images 152 in a non-cumulative manner, meaning that captions appearing in an image tend to be removed when new captioned text is presented. For example, during the transition from image 152C to image 152D, the captioned text "look at" is removed, and not included in the caption presented in image 152D. In general, captions are presented and described herein in such a non-cumulative manner for ease of illustration and explanation. However, it should be understood that in other examples, captions might be presented within one or more video sequences cumulatively or at least partially cumulatively. In such an example, for instance, image 152D might include a cumulative caption that includes the text "look at that bouncing ball," rather than the non-cumulative caption "that bouncing ball," where the prior caption ('look at that') is not included within subsequent images.

In one or more of the examples illustrated in FIG. 1A through FIG. 1D, and in accordance with one or more aspects of the present disclosure, computing system 110 may receive a sequence of images and accompanying audio data. In some examples, computing system may receive images and audio data from another system. In other examples, computing system 110 may capture a sequence of images and accompanying audio data. For instance, in a specific example that can be described with reference to FIG. 1A, camera 117 captures a sequence of images over a time period. Sensor 116 captures audio data during the same time period. Computing system 110 receives the sequence of images and the audio data. Computing system 110 synchronizes the audio data with the sequence of images to generate a video sequence in which the sounds represented by the audio data are audible during the appropriate images in video sequence 133.

Computing system 110 may transcribe or parse text from the audio data. For instance, again with reference to FIG. 1A, computing system 110 identifies data within the audio data corresponding to speech. Computing system 110 parses the speech into words (e.g., using natural language processing techniques). Computing system 110 associates a timestamp with the start and end of each of the parsed words.

Computing system 110 uses the timestamps to determine information about the duration of any audio pauses between words spoken during the speech. Computing system 110 stores the timestamp information.

Computing system 110 may add captions to the video sequence. For instance, continuing with the example and with reference to FIG. 1A and FIG. 1B, computing system 110 associates each of the parsed words with images captured when the corresponding words were spoken. In some examples, computing system 110 may use the timestamp information to associate each of the parsed words with the images. Computing system 110 generates captions 131, representing the parsed words from the audio data. Computing system 110 overlays captions 131 on images 132 within video sequence 133. Computing system 110 generates video sequence 153, such as that illustrated in FIG. 1B.

In FIG. 1B, each of captions 131 is overlaid on images captured when the corresponding words were spoken. For instance, in the example of FIG. 1B, the audio sound corresponding to the word "Hey" spoken by user 101 was interpreted (incorrectly, in the example illustrate) by computing system 110 as corresponding to the word "Hi," and the sound was detected approximately at the time image 132A was captured. Also as illustrated in FIG. 1B, an audio sound that computing system 110 determined corresponds to the word "umm," was detected at the time image 132B was captured. Further, an audio sound that computing system 110 determined corresponds to the words "look at" was detected at the time that image 132C was captured, and an audio sound that computing system 110 determined corresponds to the words "that ball!" was detected at the time that image 132D was captured. In FIG. 1B, each of the words transcribed or parsed by computing system 110 from the audio data are presented within the corresponding images 132, as illustrated by video sequence 133 of FIG. 1B.

Computing system 110 may enable user 101 to view or review video sequence 133. For instance, in some examples, video sequence 133 may be a video recording captured by user 101 (e.g., as a potential social media post), and user 101 may seek to review the video recording and any captions 131 displayed within video sequence 133. In one such example, user interface device 119 detects input that computing system 110 determines corresponds to a request to play or replay video sequence 133. Responsive to the request, computing system 110 accesses stored video sequence 133 and causes user interface device 119 to present video sequence 133 as a sequence of images. Video sequence 133 is presented (e.g., at a display) such that each of captions 131 presented in the appropriately timed images, meaning that each of captions 131 is presented at the time generally corresponding to the time that audio was detected by audio device 118. For example, in a video depicting a scene where a subject of a video is speaking (e.g., user 101), speech audio is presented in the video so that the audio is heard at a time consistent with the times that the audio was recorded, and so that the mouth of the subject of the video moves appropriately when speech audio can be heard. Similarly, computing system 110 may present captions 131 at appropriate times, in appropriate images 132, so that captions 131 are being presented at least approximately when the subject of the video can be observed saying the spoken words.

Computing system 110 may respond to a request to modify video sequence 133. For instance, in an example that can be described in connection with FIG. 1A, user interface device 119 detects input that computing system 110 determines corresponds to a request to edit one or more of captions 131 included within video sequence 133. In some examples, such input may be detected by user interface device 119 when video sequence 133 is being presented at user interface device 119 (e.g., where the input is an interaction with captioned text presented in the video on a touchscreen). In another example, such input may be detected by user interface device 119 after video sequence 133 has been presented (e.g., after user 101 reviews the video recording represented by video sequence 133), again possibly as an interaction with text presented on a display. Responsive to the request to modify video sequence 133, computing system 110 presents a user interface at user interface device 119 that includes editable text corresponding to the sequence of words transcribed by computing system 110.

FIG. 1C illustrates multiple different strings of text, each corresponding to a sequence of editable text that may be presented by or included within a user interface presented in response to a request to modify video sequence 133. As illustrated by sequence of words 141 of FIG. 1C, computing system 110 transcribed actual speech 107 captured by audio device 118 into a slightly incorrect phrase. In the example of FIG. 1C, the word "Hey" in actual speech 107 was incorrectly transcribed as "Hi" by computing system 110. User 101 (or another user) may seek to fix this error. In addition, user 101 (or another user) may choose to make additional changes to the text captions included within video sequence 133 of FIG. 1B.

Accordingly, computing system 110 may detect input that it determines corresponds to a request to correct an improperly transcribed word in video sequence 133. For instance, with reference to FIG. 1A and FIG. 1C, user interface device 119 of computing system 110 may detect interactions with user interface device 119 when user interface device 119 is presenting a user interface that includes an editable sequence of words 141, as illustrated in FIG. 1C. Computing system 110 may determine that the interactions correspond to a user moving cursor 191 into the position shown within sequence of words 141 of FIG. 1C. User interface device 119 may detect further interactions that computing system 110 determines corresponds to replacing the word "Hi" with "Hey" as shown in sequence of words 142.

Computing system 110 may detect input removing a word. For instance, referring again to FIG. 1A and FIG. 1C, user interface device 119 may detect interactions with user interface device 119 that computing system 110 determines corresponds to a user moving cursor 191 as shown within sequence of words 142. User interface device 119 may detect further interactions that computing system 110 determines corresponds to deleting the word "umm," resulting in sequence of words 143.

Computing system 110 may detect input adding a word. For instance, again with reference to FIG. 1A and FIG. 1C, user interface device 119 may detect interactions corresponding to a user moving cursor 191 to a position before the word "ball," as shown in sequence of words 143. User interface device 119 may detect further interactions that computing system 110 determines corresponds to adding the word "bouncing" before the word "ball," resulting in sequence of words 144.

Computing system 110 may associate each of the words within sequence of words 144 with one or more corresponding original words in sequence of words 141. For instance, with reference to FIG. 1C, when a word is replaced (e.g., sequence of words 141 to sequence of words 142), computing system 110 may associate the new word ("Hey") with the original word ("Hi") within sequence of words 141. Accordingly, in such an example, the timestamps associated with the original word are used to appropriately position the new word within the sequence of words. Doing so may maintain the flow, pacing, and/or timing of the text being presented as captions 131.

When a word is removed (e.g., sequence of words 142 to sequence of words 143), computing system 110 generally will have no new word to associate with the original word that was removed. In such an example (e.g., where a word is removed), the timestamp associated with the deleted word might not be used in the new text, and a caption might not be presented within images corresponding to the removed word.

When a word is inserted or added (e.g., sequence of words 143 to sequence of words 144), computing system 110 may interpolate between the timestamps of the words surrounding the inserted word(s). Stated another way, computing system 110 may associate the inserted word(s) with one or more of the original words. For instance, computing system 110 may associate the inserted word(s) with the original word prior to the insertion, and in other examples, computing system 110 may associate the inserted word(s) with the original word following the insertion. In still other examples, computing system 110 may associate the inserted word(s) with original words prior to and after the insertion, if doing so more appropriately aligns with the flow of text in the original sequence of words. In general, computing system 110 may seek to associate the inserted words with original corresponding words to ensure that that the flow of the text remains relatively consistent with the flow of text in the original sequence of words. In addition, computing system 110 may maintain the timestamps for the original word and fit in the new words so that the alignment is the same or approximately the same as the original text. In doing so, computing system 110 may give preference to maintaining timestamps of the original words, to the extent that such a preference tends to ensure that the flow of the text in the new sequence of words remains relatively consistent with the flow of text in the original sequence of words.

FIG. 1D illustrates video sequence 153 in which sequence of words 144 is presented as captions. Computing system 110 may generate video sequence 153 by evaluating the alignment of words within sequence of words 144 relative to the alignment of the original words of sequence of words 141. For instance, with reference to FIG. 1B, FIG. 1C, and FIG. 1D, computing system 110 determines which images should include words drawn from sequence of words 144. Computing system 110 determines that in sequence of words 144, the word "Hey" corresponds to the original word "Hi" and that this corresponding original word ("Hi") is presented within image 132A (see FIG. 1B) during time period 130A. Computing system 110 therefore determines that the new word "Hey" should also be presented within video sequence 153 during time period 130A (where time period 130A includes image 152A).

Computing system 110 also determines that in sequence of words 144, no new word in sequence of words 144 corresponds to original word "umm" in sequence of words 141, which is presented within video sequence 133 (see FIG. 1B) during time period 130B. Accordingly, computing system 110 determines that no caption should be presented within video sequence 153 during time period 130B. Further, computing system 110 determines that in sequence of words 144, the inserted word "bouncing" corresponds to the original word "ball" and that this corresponding original word ("ball") is presented within image 132D during time period 130D. Accordingly, computing system 110 determines that the phrase including the inserted word "bouncing" should be presented within video sequence 153 during time period 130D.

Computing system 110 generates video sequence 153 by overlaying words from sequence of words 144 on a sequence of images. For instance, computing system 110 overlays caption 151A on image 152A as illustrated in FIG. 1D. Computing system 110 overlays caption 151C on image 152C. Computing system 110 overlays caption 151D on image 152D. In the example of FIG. 1D, computing system 110 chooses not to overlay any caption on image 152D.

Computing system 110 stores video sequence 153. For instance, in some examples, computing system 110 stores video sequence 153 within computing system 110. In other examples, computing system 110 stores video sequence 153 on one or more of compute nodes 120 by transmitting video sequence 153 over network 104.

In some examples, computing system 110 may make stored video sequence 153 available for retrieval and/or playback, such as in a social media post or as an on-demand video. In such an example, computing system 110 (or another computing system having access to stored video sequence 153) may later present video sequence 153 in response to user input. For instance, in some examples, user interface device 119 of computing system 110 may detect input that computing system 110 determines corresponds to a request to present video sequence 153. Computing system 110 accesses video sequence 153 (or retrieves video sequence 153 over network 104). Computing system 110 causes video sequence 153 to be displayed at user interface device 119 with concurrent audio presented by audio device 118.

Figure 2:
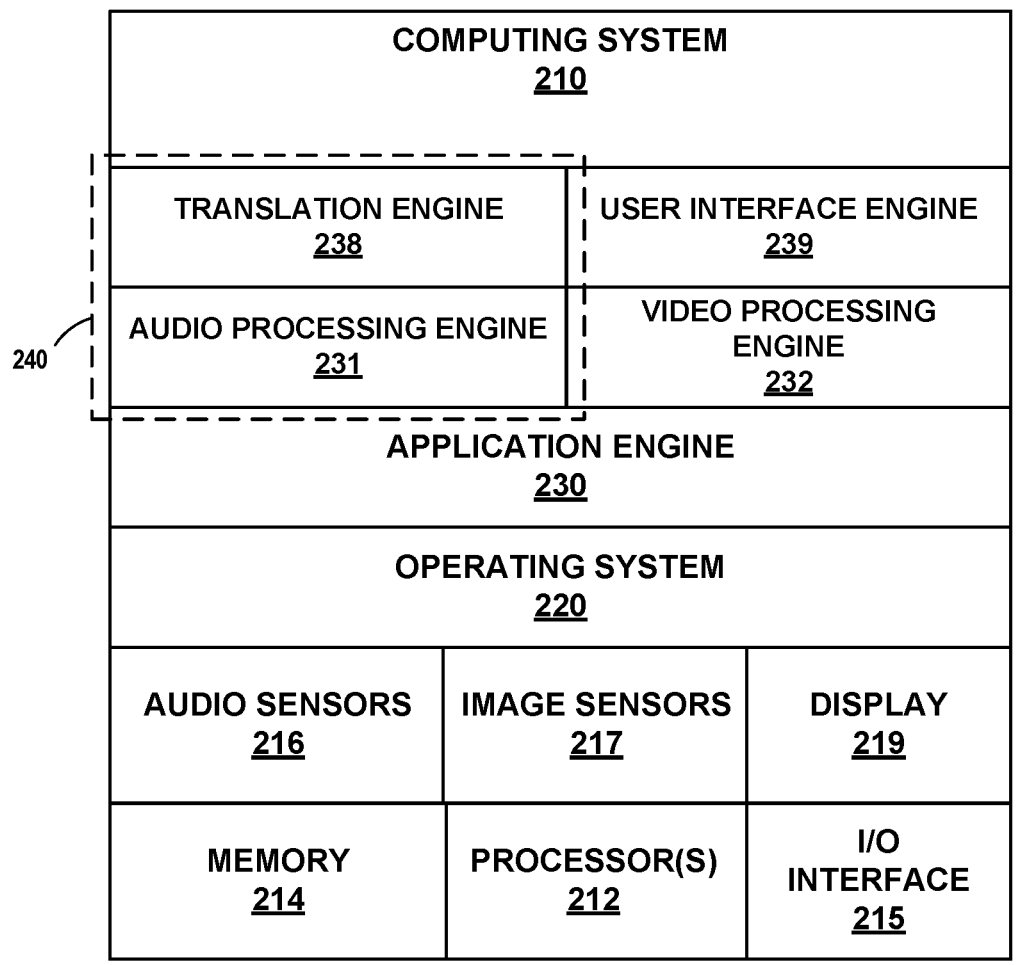
FIG. 2 is a block diagram illustrating an example computing system for generating and/or editing video captions in accordance with one or more aspects of the present disclosure.

FIG. 2 is a block diagram illustrating an example computing system for generating and/or editing video captions in accordance with one or more aspects of the present disclosure. In the example of FIG. 2, computing system 210 includes one or more processors 212, one or more memory devices 214, one or more i/o interfaces 215, one or more audio sensors 216, one or more image sensors 217, and one or more displays 219. Computing system 210 may represent an example instance of computing system 110.

In some examples, processors 212 and memory devices 214 may be integrated into a single hardware unit, such as a system on a chip (SoC). Each of processors 212 may comprise one or more of a multi-core processor, a controller, a digital signal processor (DSP), an application specific integrated circuit (ASIC), a field-programmable gate array (FPGA), processing circuitry (e.g., fixed function circuitry, programmable circuitry, or any combination of fixed function circuitry and programmable circuitry) or equivalent discrete logic circuitry or integrated logic circuitry. Memory devices 214 may include any form of memory for storing data and executable software instructions, such as random-access memory (RAM), read only memory (ROM), programmable read only memory (PROM), erasable programmable read only memory (EPROM), electronically erasable programmable read only memory (EEPROM), and Flash memory.

Processors 212 and memory devices 214 may provide a computing platform for executing operating system 220. Operating system 220 may provide a multitasking environment for executing one or more modules. Such modules may include application engine 230, audio processing engine 231, video processing engine 232, translation engine 238, and/or user interface engine 239. Memory devices 214 may connect via one or more i/o interfaces 215 to internal or external systems and/or devices, such as one or more of audio sensors 216, image sensors 217, and/or displays 219. One or more i/o interfaces 215 may incorporate network interface hardware, such as one or more wired and/or wireless network interface controllers (NICs) for communicating via a communication channel or network (e.g., a packet-based network).

One or more audio sensors 216 may correspond to sensor 116 of FIG. 1A, and may capture audio information (e.g., spoken words from a scene depicted in FIG. 1A) and output the audio information to operating system 220 and/or application engine 230. Such audio information may be processed by audio processing engine 231 pursuant to a speech recognition algorithm. Resulting text transcribed from speech may be used to generate initial captions for a sequence of images, as described herein.

One or more image sensors 217 may correspond to camera 117 of FIG. 1A, and may capture image information (e.g., images of physical environment 112 of FIG. 1A) and output the image information to operating system 220 and/or application engine 230. Captured image information may be processed by video processing engine 232 to generate a video or video sequence based on the images. Also, one or more of the captured images may be modified to include an overlaid text caption corresponding to words transcribed from speech or derived from input from a user.

One or more displays 219 may correspond to user interface device 119 of FIG. 1A, and thus descriptions of user interface device 119 provided in connection with FIG. 1A may correspond to one or more of displays 219. Display 219 may enable visual presentation of a sequence of images or a video sequence. In some examples, display 219 may act as both an input and output device, such as a presence-sensitive or touch-screen panel capable of both presenting images on the panel and detecting touch interactions with the panel.

Operating system 220 may provide an operating environment for executing one or more modules or software components, which may include application engine 230, audio processing engine 231, video processing engine 232, translation engine 238, and/or user interface engine 239. Application engine 230 may include any appropriate application for which techniques described herein may be used, including a social media application, a social networking application, a video publishing, creating or editing application or otherwise.

Audio processing engine 231 may perform functions relating to processing speech data. Audio processing engine 231 may receive audio data that includes speech and image 132 may transcribe or parse speech, including individual words, from the audio data. Audio processing engine 231 may associate a timestamp with each of the words, thereby enabling modifications to the words while preserving aspects of the timing and spacing of the original words.

Video processing engine 232 may perform functions relating to processing a sequence of images. Video processing engine 232 may generate video sequences from a set of images. In generating such video sequences, video processing engine 232 may overlay captions on selected images within a sequence of images.

Translation engine 238 may perform functions relating to translating text from one language to another. Translation engine 238 may translate specific words or sequences of words in one language into specific words or sequences of words in another language. In performing translations of sequences of words, translation engine 238 may identify words or sets of words in a sequence of translated words that correspond to words or sets of words in the original sequence of translated words. Translation engine 238 may identify such corresponding words, enabling audio processing engine 231 to generate captions for a video sequence that preserves aspects of timing and spacing of the original, untranslated words.

Modules illustrated in FIG. 2 (e.g., operating system 220, application engine 230, audio processing engine 231, video processing engine 232, translation engine 238, user interface engine 239) and/or illustrated or described elsewhere in this disclosure may perform operations described using software, hardware, firmware, or a mixture of hardware, software, and firmware residing in and/or executing at one or more computing devices. For example, a computing system may execute one or more of such modules with multiple processors or multiple devices. One or more such processors or devices may be located within a public, private, or hybrid cloud. A computing device of the computing system may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3A:
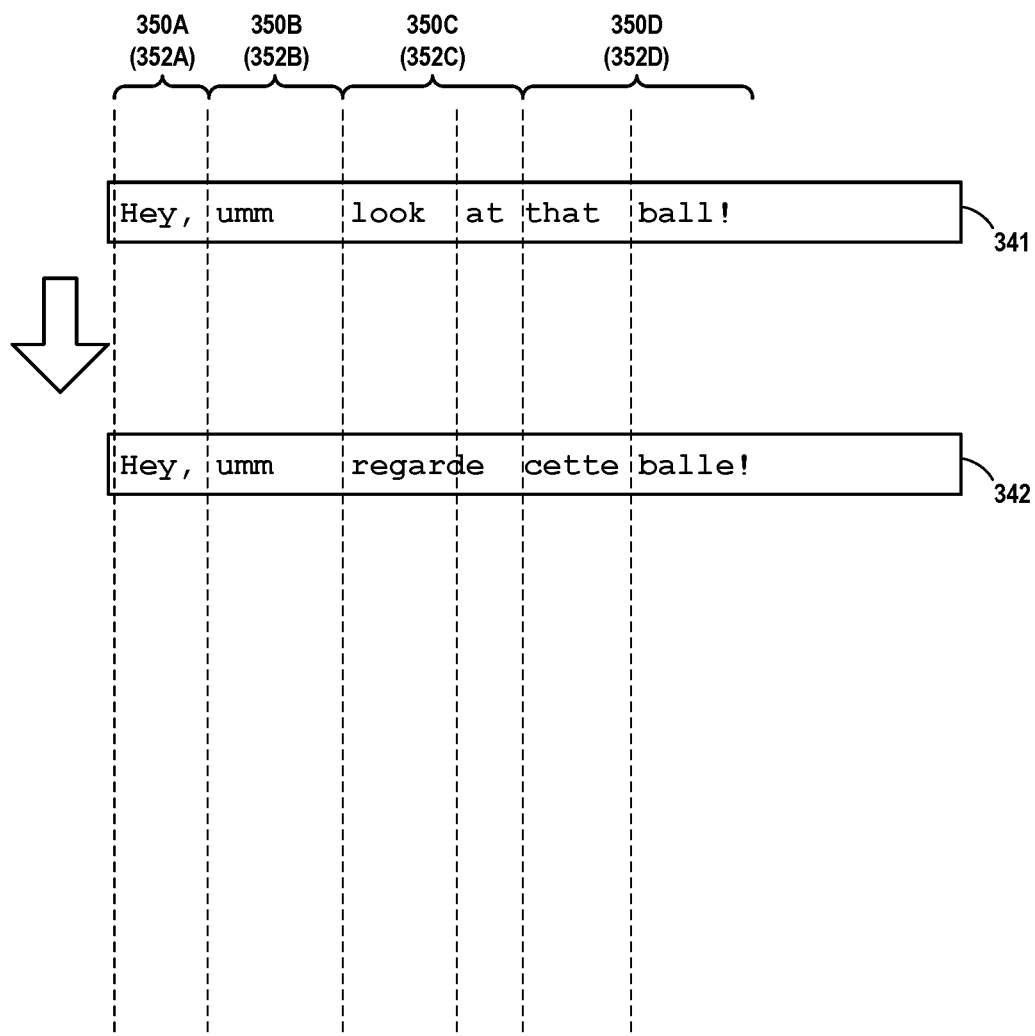
FIG. 3A is a conceptual diagram illustrating two strings of text, an original string of text and a translated string of text, in accordance with one or more aspects of the present disclosure.

FIG. 3A is a conceptual diagram illustrating two strings of text, an original string of text and a translated string of text, in accordance with one or more aspects of the present disclosure. In FIG. 3A, sequence of words 341 corresponds to a string of transcribed text, such as might be captured by audio of the scene depicted in FIG. 1A. The dashed lines illustrated in FIG. 3A correspond to timestamps for each of the words in sequence of words 341. Translated sequence of words 342 illustrates an approximate French translation of sequence of words 341, with words in the French translation aligned with corresponding words in the original text of sequence of words 341.

Figure 3B:
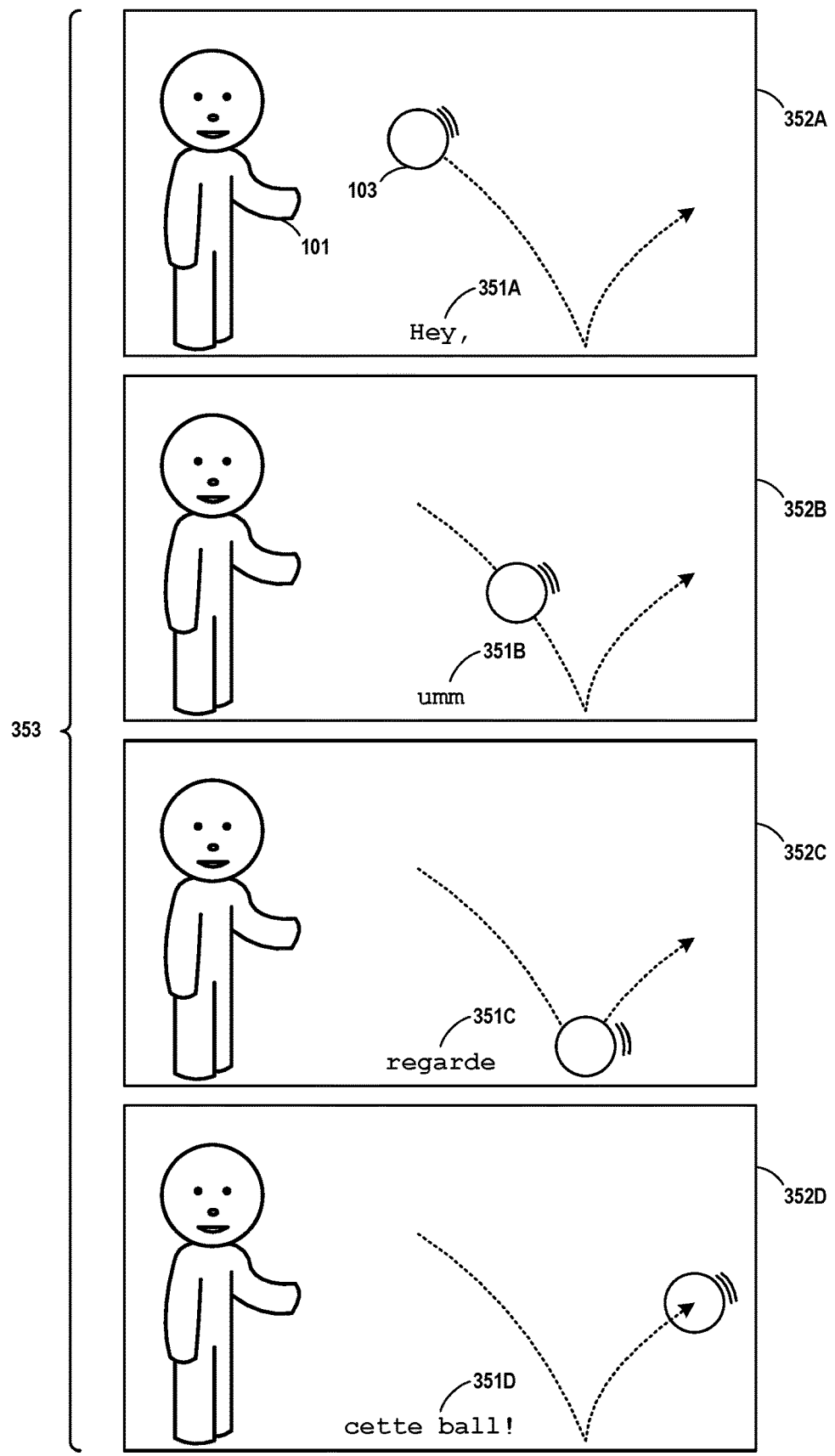
FIG. 3B is a conceptual diagram illustrating an example video sequence including a series of images overlaid with French translation captions, in accordance with one or more aspects of the present disclosure.

FIG. 3B is a conceptual diagram illustrating an example video sequence including a series of images overlaid with French translation captions, in accordance with one or more aspects of the present disclosure. In FIG. 3B, images 352A through 352D (collectively "images 352" and representing any number of images) from video sequence 353 are illustrated. Each of images 352 are overlaid with a caption corresponding to the French translation illustrated in translated sequence of words 342 of FIG. 3A.

In FIG. 3B, image 352A, which is an image occurring during time period 350A, has been annotated to include a caption ("Hey") from translated sequence of words 342 corresponding to time period 350A. Similarly, image 352B, occurring during time period 350B, has been annotated to include a word ("umm") from translated sequence of words 342 corresponding to time period 350B. Image 352C, occurring during time period 350C, has been annotated to include a French word ("regarde") from translated sequence of words 342 corresponding to time period 350C. Image 352D, occurring during time period 350D, has been annotated to include words ("cette balle!") from translated sequence of words 342 corresponding to time period 350D.

Some words from sequence of words 341 have a direct word-to-word correspondence from sequence of words 342, such as "ball" and "balle", and the captions presented in images 352 may include such words in sequence of words 342 at the respective times for the corresponding words in sequence of words 341. However, as is typical for a language translation, and as can be seen from FIG. 3A, the overlaid captions illustrated in images 352 of FIG. 3B might not have a direct word-to-word correspondence from sequence of words 341 to translated sequence of words 342. However, by aligning the timing of at least some of the words, as illustrated in FIG. 3A, the captions presented in images 352 may preserve at least aspects of the sentiment expressed by the original words spoken by user 101. In other words, non-verbal body language exhibited by user 101 (e.g., pointing at object 103) along with translated language presented as captions during the time that user 101 utters the original spoken words tends to preserve the pacing, flow, and sentiment expressed by user 101 in video sequence 353.

FIG. 3A and FIG. 3B can be used to illustrate example operations performed by computing system 210 of FIG. 2. Accordingly, one or more aspects of FIG. 3A and FIG. 3B may be described herein within the context of FIG. 2.

In accordance with one or more aspects of the present disclosure, computing system 210 may capture a sequence of images and accompanying audio data. For instance, in an example that can be described with reference to FIG. 2, image sensors 217 capture a sequence of images over a time period. Audio sensors 216 capture audio data during the same time period. Audio processing engine 231 and video processing engine 232 synchronize the audio data with the sequence of images to generate a video in which the sounds represented by the audio data are audible during the appropriate images in the sequence of images.

Computing system 210 may generate data corresponding to sequence of words 341 of FIG. 3A. For instance, continuing with the example and referring additionally to FIG. 3A, audio processing engine 231 processes the audio data to identify speech captured during the time period. Audio processing engine 231 identifies a sequence of sounds corresponding to the identified speech. Audio processing engine 231 transcribes the speech into words. Audio processing engine 231 generates sequence of words 341 as illustrated in FIG. 3A. Audio processing engine 231 associates a timestamp with the start and end of each of the transcribed or parsed words. Audio processing engine 231 determines whether the audio of the speech includes a pause between any or all of the words spoken during the speech. In some examples, the information about the timing and/or duration of such pauses may correspond to or be derived from the timestamps associated with each of the words. Audio processing engine 231 stores, in memory device 214, information about sequence of words 341, timestamps, and the timing and/or duration of any pauses between the words.

Computing system 210 may detect input corresponding to a request to modify sequence of words 341. For instance, continuing with the example being described, I/O interface 215 detects input that operating system 220 and/or user interface engine 239 determines corresponds to signals generated by a keyboard, mouse, or other input device that may be operated by a user. Operating system 220 and/or user interface engine 239 determines that the signals correspond to interactions editing text (e.g., where the text corresponds to sequence of words 341) presented at display 219 or at another display device. In another example, I/O interface 215 may detect input that operating system 220 and/or user interface engine 239 determines corresponds to signals generated by a presence-sensitive panel or touchscreen associated with display 219. In such an example, operating system 220 and/or user interface engine 239 may further determine that such signals correspond to interactions editing text presented at display 219. In still other examples, I/O interface 215 may detect input that operating system 220 and/or user interface engine 239 determines corresponds to signals generated by a voice prompt user interface or other type of user interface or user interface device used by a user to modify sequence of words 341.

Computing system 210 may translate sequence of words 341 into translated sequence of words 342. For instance, again in the example and with reference FIG. 2 and FIG. 3A, I/O interface 215 detects signals that operating system 220 determines corresponds to input, as described above. Operating system 220 outputs information about the signals to user interface engine 239. User interface engine 239 determines that the signals correspond to a request to translate sequence of words 341 into the French language. Translation engine 238 generates translated sequence of words 342 from sequence of words 341, representing an approximate French translation of sequence of words 341.

Computing system 210 may align the timing of the words in translated sequence of words 342 with one or more words in sequence of words 341. For instance, in the example being described with reference to FIG. 2 and FIG. 3A, audio processing engine 231 associates each of the words in translated sequence of words 342 with one or more corresponding words in sequence of words 341. The first two words in translated sequence of words 342 are unchanged ("Hey, umm"), so the first two words in translated sequence of words 342 may each be associated with the corresponding words of sequence of words 341. The remaining words are not the same in translated sequence of words 342, so translation engine 238 chooses an appropriate association of each word in translated sequence of words 342 with one or more corresponding words in sequence of words 341. In some examples, computing system 210 attempts to align words in translated sequence of words 342 with the timestamps associated with each of the words in sequence of words 341. Often, however, words in the translated text do not have a direct word to word correspondence to words in the original text. In some cases, a translated word may be associated with two or more original words, or a sequence of translated words may be associated with a single original word. In the example being described with reference to FIG. 3A, audio processing engine 231 associates translated word "regarde" with corresponding original words "look at." In addition, audio processing engine 231 associates "cette" with original word "that," and audio processing engine 231 associates "balle!" (and exclamation point) with original word (and exclamation point) "ball!"

In some examples, including in translations where sequence of words 341 has been changed significantly, audio processing engine 231 might not attempt to create a direct word to word correspondence. In other words, when translated sequence of words 342 is substantially different than sequence of words 341, audio processing engine 231 might take a different approach to aligning translated sequence of words 342 to sequence of words 341. In one such example, audio processing engine 231 might simply determine the time period over which sequence of words 341 occurs, and also determine the pacing and/or spacing of words associated with sequence of words 341. Audio processing engine 231 may use such information to appropriately pace and/or space words in translated sequence of words 342 accordingly, and use information about the appropriate pace and/or spacing to generate captions for a video corresponding to FIG. 3A.

Computing system 210 may generate a sequence of images captioned with words from translated sequence of words 342. For instance, again referring to the example being described with reference to FIG. 2 and FIG. 3A, video processing engine 232 accesses the sequence of images captured by image sensors 217. Video processing engine 232 determines which images correspond to timestamps for translated sequence of words 342 illustrated in FIG. 3A, and which corresponding original words are represented in the audio data during each of time periods 350. For example, during time period time period 350C, the words "look at" are represented in the audio data, so video processing engine 232 may annotate images during time period 350C with the corresponding French word(s) from translated sequence of words 342 ("regarde"). Video processing engine 232 assembles the images into video sequence 353 as illustrated in FIG. 3B.

Computing system 210 may present video sequence 353 in response to user input. For instance, in some examples, video sequence 353 may be stored at computing system 210 (e.g., in memory device 214). Video sequence 353 may be made available (e.g., by computing system 210) for playback (e.g., as a file for further editing, as a social media post, as an on-demand video, or otherwise). In such an example, 239 of computing system 210 may detect input that application engine 230 determines corresponds to a request to present video sequence 353. Application engine 230 accesses video sequence 353 within memory device 214 and causes video sequence 353 to be presented at display 219, including the sequence of captions 351 as illustrated in FIG. 3B. Application engine 230 may interact with one or more audio devices (e.g., accessible through I/O interface 215) to present audio concurrently with the display of video sequence 353.

Figure 4A:
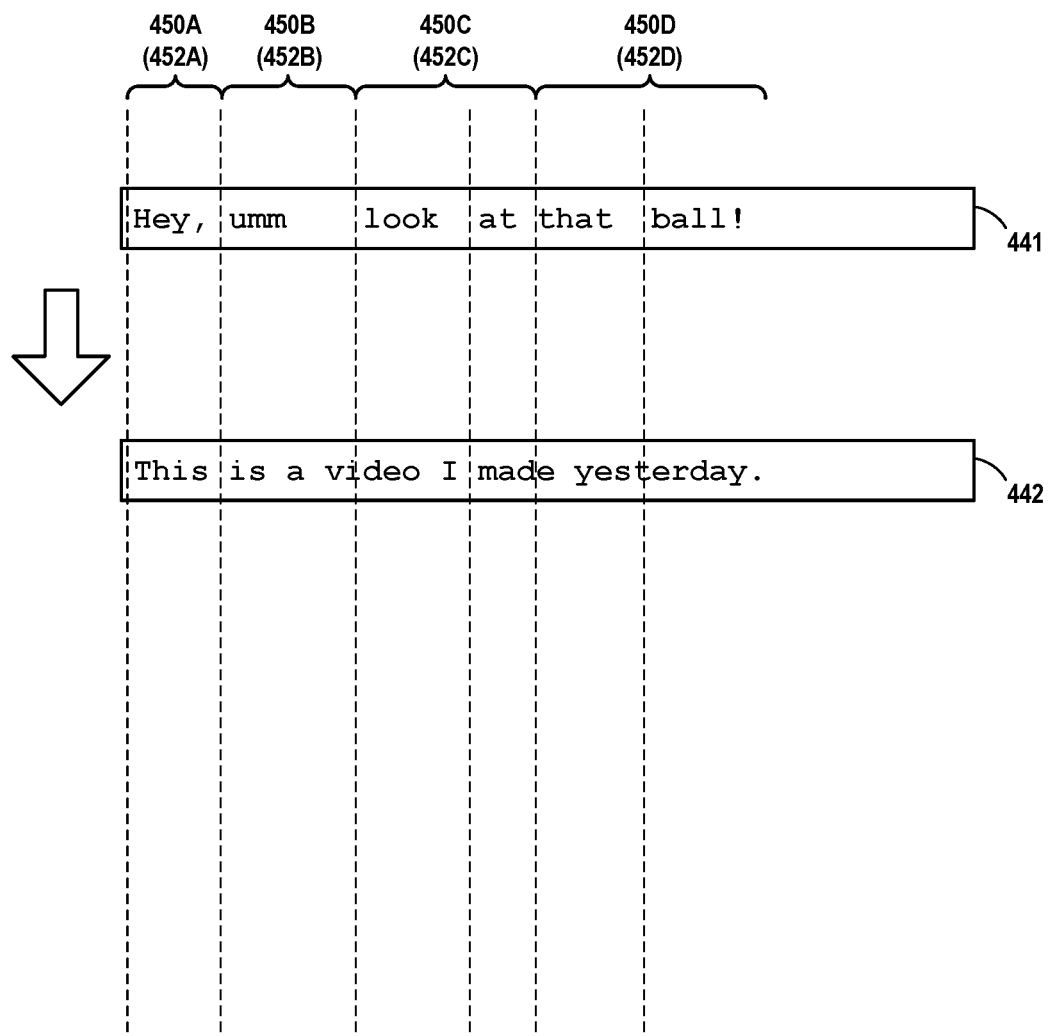
FIG. 4A is a conceptual diagram illustrating two strings of text, an original string of text and a new string of text based on user input, in accordance with one or more aspects of the present disclosure.

FIG. 4A is a conceptual diagram illustrating two strings of text, an original string of text and a new string of text based on user input, in accordance with one or more aspects of the present disclosure. In FIG. 4A, sequence of words 441 represents a string of parsed text, such as might be captured by audio of the scene depicted in FIG. 1A. As in FIG. 3A, the dashed lines illustrated in FIG. 4A correspond to timestamps for each of the words in sequence of words 441. The second string of text, sequence of words 442, is intended to represent a string of text having little or no relationship to the thought, idea, or message expressed in the original string of text (i.e., sequence of words 441). In some examples, rather than simply editing aspects or portions of sequence of words 441, a user may simply replace the original transcribed text derived from recognized speech with a new string of text, and words within that new string of text might not correspond to words within the sequence of words 441. And in general, the basic message, sentiment, or even topic might not correspond that of the original sequence of words 441.

Figure 4B:
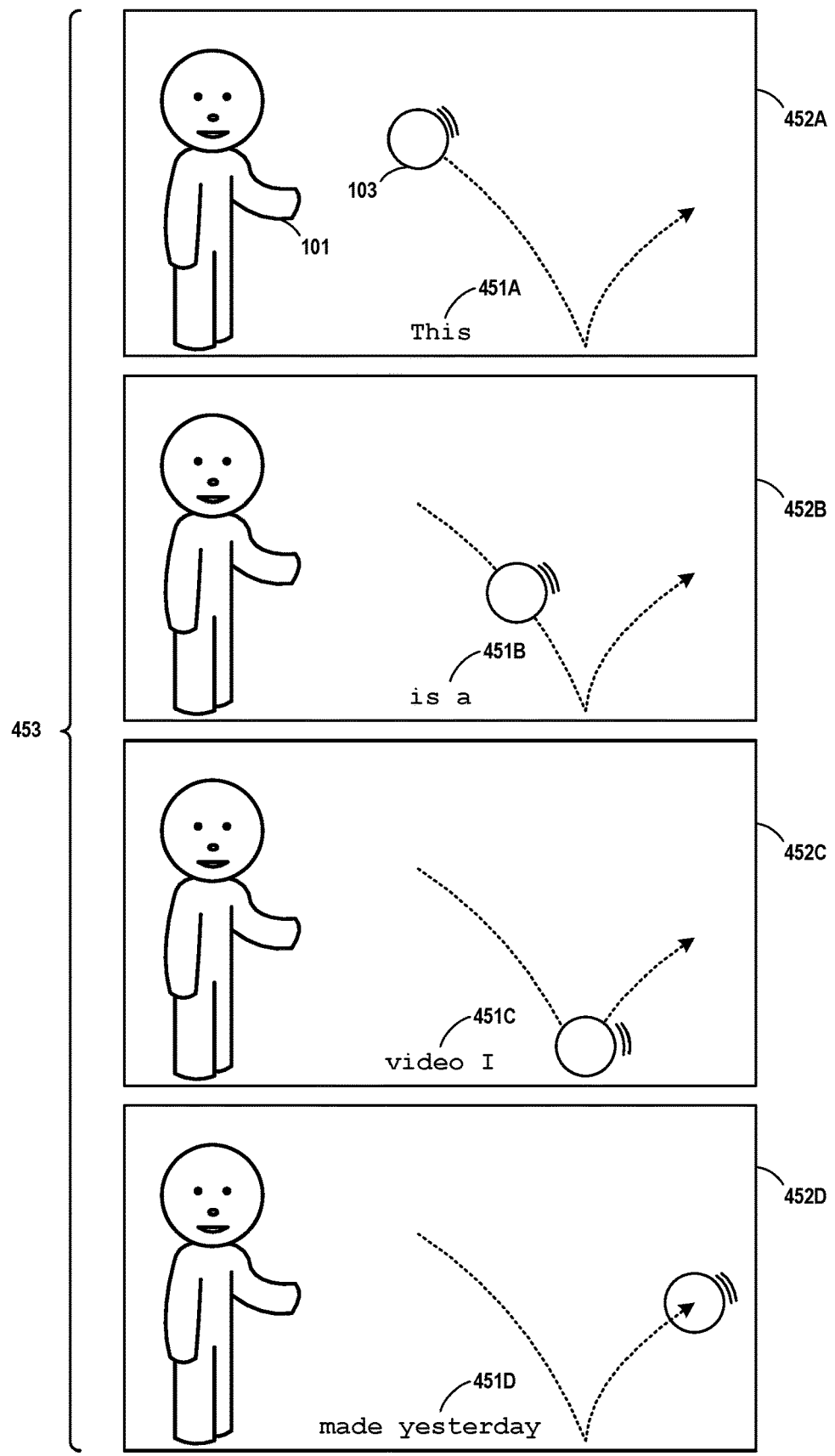
FIG. 4B is a conceptual diagram illustrating an example video sequence including a series of images overlaid with new captions, in accordance with one or more aspects of the present disclosure.

FIG. 4B is a conceptual diagram illustrating an example video sequence including a series of images overlaid with new captions, in accordance with one or more aspects of the present disclosure. In FIG. 4B, images 452A through 452D (collectively "images 452" and representing any number of images) from video sequence 453 are illustrated. Each of images 452 are overlaid with a caption corresponding to subset of the words in sequence of words 442.

In FIG. 4B, image 452A, which is an image occurring during time period 450A, has been annotated to include words from sequence of words 442 corresponding to time period 450A ("This"). Similarly, image 452B, occurring during time period 450B, has been annotated to include words from sequence of words 442 corresponding to time period 450B ("is a"). Image 452C, occurring during time period 450C, has been annotated to include words from sequence of words 442 corresponding to time period 450C ("video I"), and image 452D, occurring during time period 450D, has been annotated to include words from sequence of words 442 corresponding to time period 450D ("made yesterday").

In the example of FIG. 4B, computing system 210 may have difficulty determining a meaningful or appropriate direct word-to-word correspondence between words in sequence of words 441 and sequence of words 442. Accordingly, rather than provide a word to word correspondence between sequence of words 442 and sequence of words 441, computing system 210 may seek to preserve timing, pacing, and/or flow of the original transcribed speech derived from the audio. In some examples, computing system 210 may align sequence of words 442 with the start of the first word and the end of the last word of sequence of words 441, so that sequence of words 442, when presented within video sequence 453 as captions on images 452, tends to span the same number of images 452.

In another example, computing system 210 may calculate, based on the transcribed speech from the original audio signal, an average or typical time that the speaker takes to say a word, and an average or typical amount of time that the speaker pauses between words. Computing system 210 may use this information to determine pacing and flow, and may present sequence of words 442 as a sequence of captions in images 452 using the determined pacing and flow. In such an example, the captions may span more or less images 452 than the original text, but the pacing and/or flow may be more aligned with the spoken words in the original audio.

Figure 5:
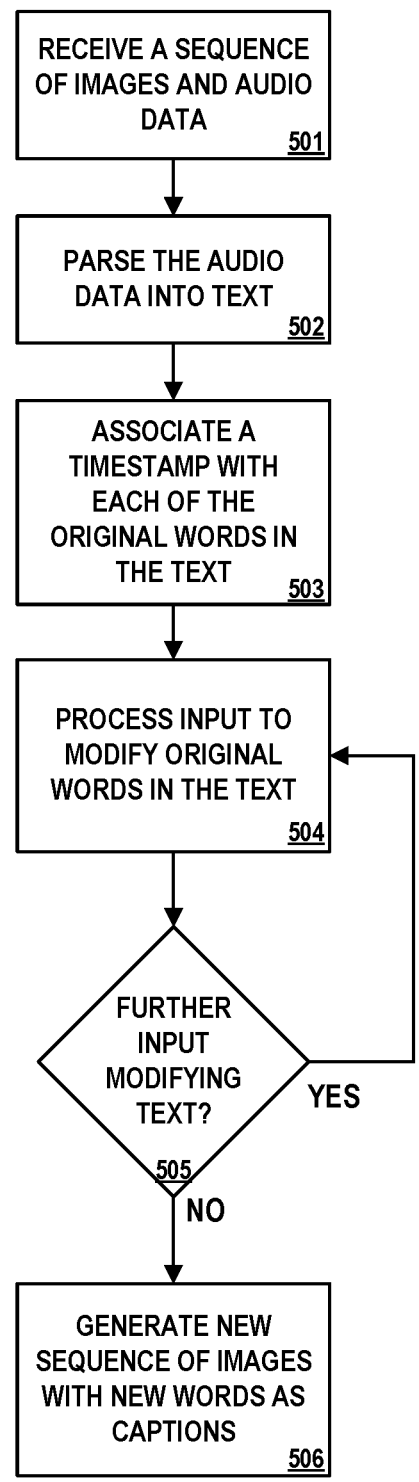
FIG. 5 is a flow diagram illustrating operations performed by an example computing system in accordance with one or more aspects of the present disclosure.

FIG. 5 is a flow diagram illustrating operations performed by an example computing system in accordance with one or more aspects of the present disclosure. FIG. 5 is described below within the context of computing system 210 of FIG. 2. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the process illustrated in FIG. 5, and in accordance with one or more aspects of the present disclosure, computing system 210 may receive a sequence of images and audio data (501). For example, with reference to FIG. 2, image sensors 217 may capture a sequence of images and audio sensors 216 may capture audio data. Each of image sensors 217 and audio sensors 216 may output data to language processing engine 240. Language processing engine 240 may process the data in preparation for generating a video sequence. In some examples, computing system 210 may receive a sequence of images and audio data from another device or system, rather than capturing a sequence of images and audio data.

Computing system 210 may transcribe the audio data into text (502). For example, again with reference to FIG. 2, audio processing engine 231 may process the audio data to identify speech. Audio processing engine 231 may identify a sequence of sounds, and parse the sequence of sounds into words. Audio processing engine 231 may generate text comprising a sequence of original words derived from the audio captured by audio sensors 216.

Computing system 210 may associate a timestamp with each of the original words in the text (503). For example, audio processing engine 231 may determine a time associated with the start and end of each of the transcribed words in the text. Audio processing engine 231 may also determine information about the timing and/or duration of any pauses occurring between the words in the text. Audio processing engine 231 may store timestamps and other timing information associated with whether the audio of the speech includes a pause between any or all of the words spoken during the speech. In some examples, application engine 230 of computing system 210 may store timestamps and information about the timing and/or duration of such pauses in memory device 214.

Computing system 210 may process input to modify original words in the text (504). For example, still referring to FIG. 2, I/O interface 215 may detect signals that operating system 220 determines corresponds to input. Operating system 220 outputs information about the signals to user interface engine 239. User interface engine 239 determines that the signals correspond to editing interactions. In some examples, such interactions may be touch interactions on a touch screen where the text to be edited is displayed. The interactions are interpreted as edits a user is seeking to perform to the original words in the text. In some examples, the original words in the text may be superimposed on a video sequence that plays in the background. User interface engine 239 modifies the original text in response to the input.

Computing system 210 may determine that further modifications are being made to the text (YES path from 505). For example, I/O interface 215 may detect further signals that operating system 220 determines corresponds to further interactions editing the original words in the text. User interface engine 239 further modifies the original text in response to the further input. Eventually, computing system 210 determines that further modifications are no longer being made to the text (NO path from 505).

Computing system 210 may generate a new sequence of images with new words as captions (506). For example, and referring again to FIG. 2, audio processing engine 231 may associate each of the new words (words from the modified text generated in response to user input) with one or more corresponding original words. Audio processing engine 231 may use the correlations with the original words to determine, based on the timestamps for the original words, appropriate images in the sequence of images that should be captioned with a corresponding new word. Audio processing engine 231 may, for new words replacing original words, use the timestamp associated with the original word to determine which images should be captioned. Audio processing engine 231 may, for new words being inserted into original text, use the timestamps for words surrounding the words adjacent to the insertion to determine which images should be captioned with the inserted words. In some examples, audio processing engine 231 may interpolate an appropriate timestamp or timing for the inserted words based on the timestamps for the adjacent words. Video processing engine 232 may assemble the captured images into a video sequence. Video processing engine 232 may overlay captions, using the new sequence of words, on images within the video sequence.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., computing systems 110, 210, compute nodes 120, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some examples, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. A system comprising a storage system and processing circuitry having access to the storage system, wherein the processing circuitry is configured to:
   receive audio data associated with a scene occurring over a time period, wherein the audio data includes data representing speech uttered during the time period;
   transcribe the audio data of the speech into text, wherein the text includes a sequence of original words;
   associate a timestamp with each of the original words during the time period;
   receive, responsive to user input, a sequence of new words; and
   associate a timestamp with each of the new words in the sequence of new words by using the timestamps associated with the original words to determine a corresponding time during the time period for each of the new words.

2. The system of claim 1, wherein the processing circuitry is further configured to:
   present the sequence of new words according to the timestamp associated with each of the new words.

3. The system of claim 2,
wherein to receive audio data, the processing circuitry is further configured to receive a sequence of images and the audio data occurring over the time period; and
wherein to present the sequence of new words, the processing circuitry is further configured to generate a new sequence of images with each of the new words overlaid on one or more of the images according to the timestamp associated with each of the new words.

4. The system of claim 3, wherein the sequence of original words includes a plurality of unchanged original words representing original words not changed in the sequence of new words, and wherein to generate the new sequence of images, the processing circuitry is further configured to:
overlay each of the unchanged original words as a caption on one or more of the images in the sequence of images based on the respective timestamps associated with the unchanged original words.

5. The system of claim 1, wherein to receive the sequence of new words, the processing circuitry is further configured to:
receive, for each of the new words, information identifying one or more original words that the new word replaces.

6. The system of claim 5, wherein to associate a timestamp with each of the new words, the processing circuitry is further configured to:
associate the timestamp of the one or more original words that the new word replaces.

7. The system of claim 1, wherein to receive the sequence of new words, the processing circuitry is further configured to:
receive a sequence of foreign language words by translating the sequence of original words.

8. The system of claim 1, wherein to associate the timestamp with each of the original words, the processing circuitry is further configured to:
associate, for each of the original words, a starting timestamp corresponding to the start of the original word during the time period and an ending timestamp corresponding to the end of the original word during the time period.

9. The system of claim 1, wherein to associate the timestamp with each of the original words, the processing circuitry is further configured to:
associate each of the original words with a time period corresponding to a pause between each of the original words.

10. The system of claim 1,
wherein to receive the sequence of new words, the processing circuitry is further configured to receive a sequence of words in which a deleted original word has been removed from the sequence of original words; and
wherein to associate each of the new words with one or more corresponding original words, the processing circuitry is further configured to associate each of the new words with one or more original words without associating any of the new words with the deleted original word.

11. A method comprising:
receiving, by a computing system, audio data associated with a scene occurring over a time period, wherein the audio data includes data representing speech uttered during the time period;
transcribing, by the computing system, the audio data of the speech into text, wherein the text includes a sequence of original words;
associating, by the computing system, a timestamp with each of the original words during the time period;
receiving, by the computing system and responsive to user input, a sequence of new words; and
associating, by the computing system, a timestamp with each of the new words in the sequence of new words by using the timestamps associated with the original words to determine a corresponding time during the time period for each of the new words.

12. The method of claim 11, further comprising:
presenting, by the computing system, the sequence of new words according to the timestamp associated with each of the new words.

13. The method of claim 12, wherein receiving audio data includes receiving a sequence of images and the audio data occurring over the time period, and wherein presenting the sequence of new words includes:
generating a new sequence of images with each of the new words overlaid on one or more of the images according to the timestamp associated with each of the new words.

14. The method of claim 13, wherein the sequence of original words includes a plurality of unchanged original words representing original words not changed in the sequence of new words, and wherein generating the new sequence of images includes:
overlaying each of the unchanged original words as a caption on one or more of the images in the sequence of images based on the respective timestamps associated with the unchanged original words.

15. The method of claim 11, wherein receiving the sequence of new words includes:
receiving, for each of the new words, information identifying one or more original words that the new word replaces.

16. The method of claim 15, wherein associating a timestamp with each of the new words includes:
associating the timestamp of the one or more original words that the new word replaces.

17. The method of claim 11, wherein receiving the sequence of new words includes:
receiving a sequence of foreign language words by translating the sequence of original words.

18. The method of claim 11, wherein associating the timestamp with each of the original words includes:
associating, for each of the original words, a starting timestamp corresponding to the start of the original word during the time period and an ending timestamp corresponding to the end of the original word during the time period.

19. The method of claim 11, wherein associating the timestamp with each of the original words includes:
associating each of the original words with a time period corresponding to a pause between each of the original words.

20. A non-transitory computer-readable storage medium comprising instructions that, when executed, configure processing circuitry of a computing system to:
receive audio data associated with a scene occurring over a time period, wherein the audio data includes data representing speech uttered during the time period;
transcribe the audio data of the speech into text, wherein the text includes a sequence of original words;
associate a timestamp with each of the original words during the time period;
receive, responsive to user input, a sequence of new words; and associate a timestamp with each of the new words in the sequence of new words by using the timestamps associated with the original words to determine a corresponding time during the time period for each of the new words.

* * * * *